United States Patent
Zahemszky et al.

(10) Patent No.: US 11,457,488 B2
(45) Date of Patent: Sep. 27, 2022

(54) CONCURRENT ID ALLOCATION IN A SERVICE-BASED ARCHITECTURE

(71) Applicant: Telefonaktiebolaget LM Ericsson (publ), Stockholm (SE)

(72) Inventors: András Zahemszky, Sollentuna (SE); Gergely Pongrácz, Budapest (HU); Balázs Pinczel, Budapest (HU); Dinand Roeland, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 15 days.

(21) Appl. No.: 17/055,121

(22) PCT Filed: May 15, 2018

(86) PCT No.: PCT/SE2018/050497
§ 371 (c)(1),
(2) Date: Nov. 12, 2020

(87) PCT Pub. No.: WO2019/221646
PCT Pub. Date: Nov. 21, 2019

(65) Prior Publication Data
US 2021/0219356 A1   Jul. 15, 2021

(51) Int. Cl.
*H04W 4/00* (2018.01)
*H04W 76/11* (2018.01)
(Continued)

(52) U.S. Cl.
CPC ......... *H04W 76/11* (2018.02); *H04W 12/041* (2021.01); *H04W 12/0433* (2021.01); *H04W 12/69* (2021.01)

(58) Field of Classification Search
CPC ... H04W 28/04; H04W 72/04; H04W 72/042; H04W 88/08; H04W 76/11;
(Continued)

(56) References Cited

U.S. PATENT DOCUMENTS 5,781,536 A * 7/1998 Ahmadi ................ H04W 28/26
                                                    370/252
6,144,983 A * 11/2000 Klots .......................... G06F 9/52
                                                    718/104
(Continued)

FOREIGN PATENT DOCUMENTS

| EP | 3167575 B1 * | 9/2021 | ............. H04L 47/20 |
| WO | WO-2019221646 A1 * | 11/2019 | ......... H04L 61/2061 |
| WO | WO-2021090248 A1 * | 5/2021 | ............. H04W 24/10 |

OTHER PUBLICATIONS

Author Unknown, "Technical Specification Group Services and System Aspects; System Architecture for the 5G System; Stage 2 (Release 15)," Technical Specification 23.501, Version 15.1.0, 3GPP Organizational Partners, Mar. 2018, 201 pages.
(Continued)

*Primary Examiner* — Phuongchau Ba Nguyen
(74) *Attorney, Agent, or Firm* — Withrow & Terranova, PLLC

(57) ABSTRACT

A method and control plane node capable of receiving, from a requester, a request for a unique identifier, selecting an identifier from a pool comprising a plurality of unique identifiers held by the control plane node, creating a key representing the selected identifier in the pool, attempting to write to an initial version of a value of the created key in order to create a key-value pair in the key-value store, wherein the writing is successful if no write previously has been performed to said initial version of the value, and if so returning, to the requester, the selected identifier as an allocated identifier.

14 Claims, 3 Drawing Sheets

(51) Int. Cl.
*H04W 12/0433* (2021.01)
*H04W 12/69* (2021.01)
*H04W 12/041* (2021.01)

(58) Field of Classification Search
CPC ........... H04W 12/041; H04W 12/0433; H04W 12/69; H04L 5/0007; H04L 61/2061; H04L 61/2007
See application file for complete search history.

(56) References Cited

U.S. PATENT DOCUMENTS

| | | | |
|---|---|---|---|
| 9,130,846 B1* | 9/2015 | Szabo | H04L 41/0893 |
| 11,178,143 B2* | 11/2021 | Xu | H04W 12/0431 |
| 2002/0161836 A1* | 10/2002 | Hosomi | H04L 67/61 |
| | | | 709/203 |
| 2006/0136376 A1* | 6/2006 | Jain | G06F 16/1774 |
| 2007/0223702 A1* | 9/2007 | Tengler | H04L 9/3263 |
| | | | 380/270 |
| 2018/0054836 A1 | 2/2018 | Mizikovsky | |
| 2018/0219783 A1* | 8/2018 | Pfister | H04L 45/745 |
| 2021/0334263 A1* | 10/2021 | Roeland | G06F 16/2291 |

OTHER PUBLICATIONS

Author Unknown, "Working with IndexedDB," Google Developers, Last updated Apr. 11, 2018, Retrieved on Jan. 18, 2019 from https://developers.google.com/web/ilt/pwa/working-with-indexeddb, 27 pages.

Huawei et al., "S2-183458: Resource management of UPF shared by multiple SMFs," Third Generation Partnership Project (3GPP), SA WG2 Meeting #127, Apr. 16-20, 2018, 5 pages, Sanya, China.

International Search Report and Written Opinion for International Patent Application No. PCT/SE2018/050497, dated Jan. 28, 2019, 11 pages.

* cited by examiner

CONCURRENT ID ALLOCATION IN A SERVICE-BASED ARCHITECTURE

This application is a 35 U.S.C. § 371 national phase filing of International Application No. PCT/SE2018/050497, filed May 15, 2018, the disclosure of which is incorporated herein by reference in its entirety.

TECHNICAL FIELD

The invention relates to a method of a control plane node of allocating, for a communication device accessing a network in which the control plane node is arranged, a unique identifier using a key-value store, and a control plane node performing the method.

BACKGROUND

Fourth generation (4G) data- and telecommunication Evolved Packet Core (EPC) network architecture consists of large monolithic nodes, such as Serving Gateway (S-GW), Packet Data Network Gateway (P-GW), Mobility Management Entity (MME), etc., where scalability and resiliency was left to the vendors to implement.

As a current trend, large monolithic nodes are divided into small functional units. These small units can run e.g. as containers in data centres, and can be individually scaled as demand increase or decrease. In other words, multiple instances of the same (micro-)service can execute in the system with identical responsibility.

Now, 3rd Generation Partnership Project (3GPP) is defining a fifth generation (5G) core network (5GC), where control plane is decomposed into smaller services and is built following cloud-native principles.

In the new 3GPP architecture, User Plane Function (UPF) is still a large monolithic entity, even though the specification allows to chain-couple multiple UPFs. In recent work, the applicant takes this idea one step further and decomposes the UPF into many small μUPFs. Depending on the requirements and the use case, it is possible to decompose a set of μUPFs into a service chain for a user. This approach of building the user plane has three main advantages: 1) flexibility is introduced to support diverse 5G use cases, 2) time-to market for introducing new services can be reduced, and 3) techniques from cloud-based design can be leveraged on.

In the 5GC architecture, it is necessary to allocate identifiers. In a decomposed and cloud-native control plane it may happen that multiple parallel-running instances need to allocate unique identifiers for users from a common pool. In such a scenario, assigning the same identifier for two different users must be avoided.

SUMMARY

An object of the present invention is to solve, or at least mitigate, this problem in the art and thus to provide an improved method of a control plane node of allocating, for a communication device accessing a network in which the control plane node is arranged, a unique identifier.

This object is attained in a first aspect of the invention by a method of a control plane node of allocating, for a communication device accessing a network in which the control plane node is arranged, a unique identifier using a key-value store. The method comprises receiving, from a requester, a request for a unique identifier, selecting an identifier ("30") from a pool comprising a plurality of unique identifiers held by the control plane node, creating a key representing the selected identifier in the pool, attempting to write to an initial version of a value of the created key in order to create a key-value pair in the key-value store, wherein the writing is successful if no write previously has been performed to said initial version of the value; and if so returning, to the requester, the selected identifier as an allocated identifier.

This object is attained in a second aspect of the invention by a control plane node configured to allocate, for a communication device accessing a network in which the control plane node is arranged, a unique identifier using a key-value store, the control plane node comprising a processing unit and a memory, said memory containing instructions executable by said processing unit, whereby the control plane node is operative to receive, from a requester, a request for a unique identifier, select an identifier from a pool comprising a plurality of unique identifiers held by the control plane node, create a key representing the selected identifier in the pool, attempt to write to an initial version of a value of the created key in order to create a key-value pair in the key-value store, wherein the writing is successful if no write previously has been performed to said initial version of the value, and if so to return, to the requester, the selected identifier as an allocated identifier.

Hence, a requester such as e.g. a mobile phone makes a request for a unique identifier to be allocated. Upon receiving the request, a control plane node such as e.g. a Session Management Function (SMF) determines that an identifier is to be allocated, and selects an identifier from a pool comprising a plurality of unique identifiers. For instance, the pool comprises integer numerical numbers ranging from 1 to 100, and the control plane node selects "30" as a number to be allocated as an identifier.

The control plane node then creates a key representing the selected identifier in the pool. In this particular example the key is selected for illustrative purposes to be "value_30". This key will subsequently be used to represent the particular number "30" in the pool, i.e. the selected identifier, as bookkeeping of the pool is done in a so called key-value database or key-value store. Hence, there must be an association between the identifier selected from the pool(s) of identifiers and the key.

Thereafter, the control plane node attempts to write to an initial version of a value of the created key "value_30" in order to create a key-value pair "any value, value_30" in the key-value store. In a key-value store, every record as identified by the key may have different fields or values. Thus, different values may be written to the same key, and the key-value store is in this invention assumed to be capable of handling versioning of the values written to a particular key.

Now, assuming that no value previously has been written to the key for the initial version of the value, the writing is successful, and the control plane node will return the selected identifier ("30") as an allocated identifier to the requester. Hence, the selected identifier "30" is reserved from the pool. If not, the write procedure will fail, and the selected identifier ("30") will not be allocated. As a consequence, the control plane node will have to start over and select another identifier from the pool.

Advantageously, with this solution, there is no need for the control plane node to lock the pool upon selecting an identifier to be allocated, which allows for a greater degree of parallelism and reduces latency. Further advantageous is that the identifier can be allocated without the control plane node having to go over the whole pool for determining whether a particular identifier already has been allocated.

In an embodiment, the key name is configured to comprise an indication of the identifier selected from the pool.

In another embodiment, the selected identifier is configured to be encoded in the key name.

In a further embodiment, the key name is configured to comprise an identifier of the pool from which the identifier is selected.

In yet a further embodiment, the identifier of the pool is configured to be encoded in the key name.

In another embodiment, if the attempt to write to an initial version of a value of the created key in order to create a key-value pair in the key-value store is unsuccessful, the method further comprises selecting another identifier from the pool comprising a plurality of unique identifiers held by the control plane node, creating a further key representing said selected another identifier in the pool, attempting to write to an initial version of a value of said created further key in order to create a further key-value pair in the key-value store, wherein the writing is successful if no write previously has been performed to said initial version of the value of said created further key, and if so returning, to the requester, the selected another identifier as an allocated identifier.

In a third aspect of the invention, a computer program is provided comprising computer-executable instructions for causing a control plane node to perform steps recited in the method of the first aspect when the computer-executable instructions are executed on a processing unit included in the control plane node.

In a fourth aspect of the invention, a computer program product is provided comprising a computer readable medium, the computer readable medium having the computer program of the third aspect embodied thereon.

Further embodiments will be discussed in the following.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
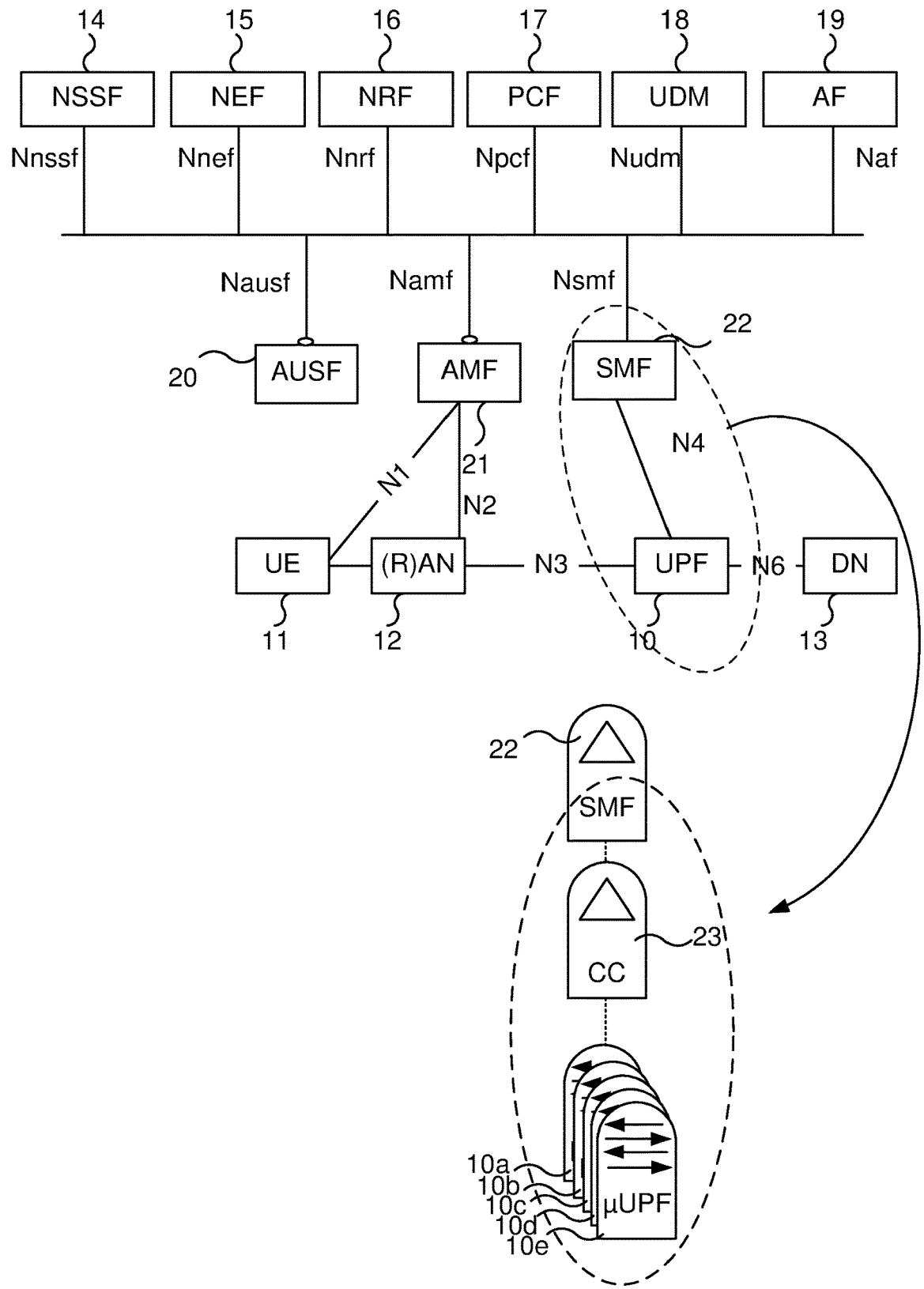
FIG. 1 shows a 5GC architecture.

FIG. 1 shows a 5GC architecture as depicted in 3GPP TS 23.501, where the UPF 10 is illustrated to have been decomposed into many small μUPFs 10*a-e*. The UPF is a service function that processes user plane packets; processing may include altering the packet's payload and/or header, interconnection to data network(s), packet routing and forwarding, etc.

The network of FIG. 1 is shown to comprise a User Equipment (UE, 11) in the form of for instance a mobile phone, a Radio Access Network (RAN, 12), and a Data Network (DN, 13).

Further, the network is shown to comprise a Network Slice Selection Function (NSSF, 14) for handling network slicing, a Network Exposure Function (NEF, 15) for exposing capabilities and events, an NF (Network Function) Repository Function (NRF, 16) for providing discovery and registration functionality for NFs, a Policy Control Function (PCF, 17), Unified Data Management (UDM, 18) for storing subscriber data and profiles, and an Application Function (AF, 19) for supporting application influence on traffic routing.

Moreover, the network is shown to comprise an Authentication Server Function (AUSF, 20) for storing data for authentication of UE, an Access and Mobility Function (AMF, 21) for providing UE-based authentication, authorization, mobility management, etc., and a Session Management Function (SMF, 22) configured to perform session management, e.g. session establishment, modify and release, etc.

With the decomposition of the UPF 10 into μUPFs 10*a-e*, the functionality of the SMF 22 will slightly change, and a so called Chain Controller (CC, 23) may be introduced for handling setup and maintenance of service chains in the user plane, as illustrated on a right-hand side of FIG. 1.

The decomposition of the UPF 10 into μUPFs 10*a-e* an be applied to the 3GPP UPF, but just as well to SGi/N6 interface functions, to parts of virtual RAN and to fixed network components, as well as to a virtual Broadband Network Gateway (vBNG).

The μUPFs 10*a*-10*e* are hosted on user plane nodes. It is possible that a single service chain spans across multiple user plane nodes. For example, some pUPFs are located in a central site, while some μUPFs are located in the local site for a given user.

The SMF 22 requests a service for the user by providing a service description to the CC 23. The overall responsibility of the CC is to make sure that the requested service is installed for the user in the user plane nodes. From a high-level perspective, the CC 23 performs its task by identifying which user plane functions are needed for the requested service, which order the user plane packets should follow the user plane functions and on which user plane nodes the identified user plane functions should be executed for the given user. Also, it may be the task of the CC 23, the SMF 22, or some other control plane node to allocate identifiers.

In a core network, several unique identifiers will have to be allocated for the users. For example, the users should receive a unique Internet Protocol (IP) address/IPv6 prefix. In the 5GC architecture, the SMF 22 selects the IP address.

As another example, a unique Tunnel Endpoint Identifier (TEID) has to be allocated from a pool of an SGW (for EPC) or of an SGW-U (for EPC with Control and User Plane Separation) for each bearer, or from a pool of the UPF pool for each Packet Data Unit (PDU) session (for 5GC), which a base station has to include in uplink packets to be able to correctly de-multiplex the uplink packets at the user plane node.

In a decomposed and cloud-based control plane it may happen that multiple parallel-running instances need to allocate unique identifiers (IP addresses or TEIDs) for users from a common pool. In such a scenario, assigning the same identifier for two different users must be avoided.

Figure 2:
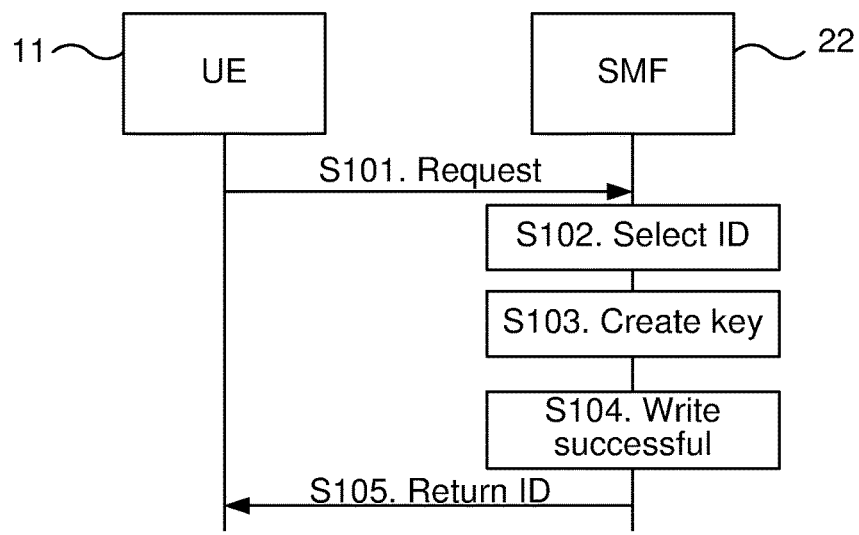
FIG. 2 shows a signalling diagram illustrating an embodiment of a method of a control plane node of allocating, for a communication device accessing a network in which the control plane node is arranged, a unique identifier using a key-value store.

FIG. 2 shows a signalling diagram illustrating an embodiment of a method of a control plane node of allocating, for a communication device accessing a network in which the control plane node is arranged, a unique identifier using a key-value store.

Now, assuming that a control plane entity of a core network, such as for instance the SMF 22 of a 5G communication system, is to allocate an identifier to a wireless communication device (WCD) such as a smart phone, tablet, gaming console, television set, etc., or a fixed communication device, commonly referred to as customer-premises equipment (CPE), or a user of said devices, accessing a network hosting the control plane entity. In this particular example it is assumed that the SMF 22 allocates an identifier to the UE 11.

As previously discussed, the identifier may be embodied in the form of a unique IP address, a TEID, or simply a unique numerical value to be used by the communication device, by the user or by the network on behalf of the user or the device.

In the art, this is typically performed by turning to a pool of unique identifiers (i.e. identifiers which at least are unique within the pool)—in the form of e.g. IP addresses, TEIDs or numerical values—which are to be assigned as identifiers to communication devices, lock the pool, mark the entry in the pool of a selected identifier, and unlock the pool. This has a number of disadvantages, for instance that it creates latency when a plurality of identifiers are to be selected for allocation. Further, if the entity or process that placed the lock on the pool crashes before the entity/process unlocked the pool, more advanced mechanisms are required to detect this situation and to recover from it.

This is solved by having the control plane entity, in the following exemplified in the form of the SMF 22, allocate identifiers to the UE 11 from one or more pools of unique identifiers according to an embodiment, and utilize a so called key-value store or key-value database when allocating the identifiers.

In this exemplifying embodiment, the identifiers are embodied in the form of numerical values to be allocated.

In a first step S101, a requester in the form of the UE 11 (or for instance a fixed network device, a group of UEs, a network function acting on behalf of a UE, etc.) makes a request for a unique identifier to subsequently be allocated.

Upon receiving the request, the SMF 22 determines that an identifier is to be allocated, and selects an identifier from a pool comprising a plurality of unique identifiers in step S102. For instance, the pool comprises integer numerical numbers ranging from 1 to 100, and the SMF 22 selects "30" as a number to be allocated as an identifier.

In a third step S103, the SMF 22 creates a key representing the selected identifier in the pool. In this particular example the key is selected for illustrative purposes to be "value_30". This key will subsequently be used to represent the particular number "30" in the pool, i.e. the selected identifier, as bookkeeping of the pool is done in a so called key-value database or key-value store. Hence, there must be an association between the identifier selected from the pool(s) of identifiers and the key. In this exemplifying embodiment, the SMF 22 includes an indication of the selected identifier "30" in the name of the key "value_30". In this example, the identifier "30" is configured to be encoded in the key name "value_30".

Thereafter, in step S104, the SMF 22 attempts to write to an initial version of a value of the created key "value_30" in order to create a key-value pair "value_30", "any value" in the key-value store. As is understood, any value may be written to the key in this embodiment; the purpose of using the key-value store is to associate the identifier selected from the pool with a key of the key-value store. For instance a value "1" may be written to the key, or some unique ID of the writer, or a random value.

In a key-value store, every record as identified by the key may have different fields or values. Thus, different values may be written to the same key, and the key-value store is in this invention assumed to be capable of handling versioning of the values written to a particular key.

Now, assuming that no value previously has been written to the key for the initial version ("version=1") of the value, the writing is successful.

If so, the SMF 22 will in step S105 return the selected identifier ("30") as an allocated identifier to the UE 11. Hence, the selected identifier "30" is reserved from the pool. If not, the write procedure will fail, and the selected identifier ("30") will not be allocated. As a consequence, the SMF 22 will have to start over and select another identifier from the pool.

As previously has been mentioned, it is assumed that the key-value store supports versioning. This implies the following from a more general perspective. If for a created key k a value a is written, then key k with value a is created. The version of this key-value pair is now 1. Reading key k will return value a. Upon a subsequent write, the version is increased. So when writing value b to key k, the version becomes 2. Reading key k will now return value b.

Aversion may be specified upon reading to retrieve historical data. For example, reading version 1 from key k will return value a. As discussed hereinabove, a version may also be specified upon writing. However, only writing to the next version is allowed. In accordance with the example above, writing value c to version 3 will succeed, while writing value d to version 1 will fail. In fact, even writing value a to version 1 will fail (even though it may be envisaged that since a already is written to version 1, "write ok" may be returned since the write does not lead to a changed value).

In this embodiment, the SMF 22 always attempts to write to the initial version ("version=1") of the value in a key-value pair, which write is successful unless the initial version of the value has been written to previously. It should be noted that while an intuitive and straightforward versioning would follow a linear path, i.e. 1, 2, 3, etc., the versioning could take on other forms.

In step S105, the SMF 22 allocates the selected identifier "30" to the UE 11 by returning the identifier. However, it is to be understood that an identifier to be allocated to the UE 11 not necessarily is sent to the UE 11, but may be used in the network to identify the UE 11 or its user.

Advantageously, with this embodiment, there is no need for the SMF 22 to lock the pool upon selecting an identifier to be allocated, which allows for a greater degree of parallelism and reduces latency. Further advantageous is that the identifier can be allocated without the SMF 22 having to go over the whole pool for determining whether a particular identifier already has been allocated.

Figure 3:
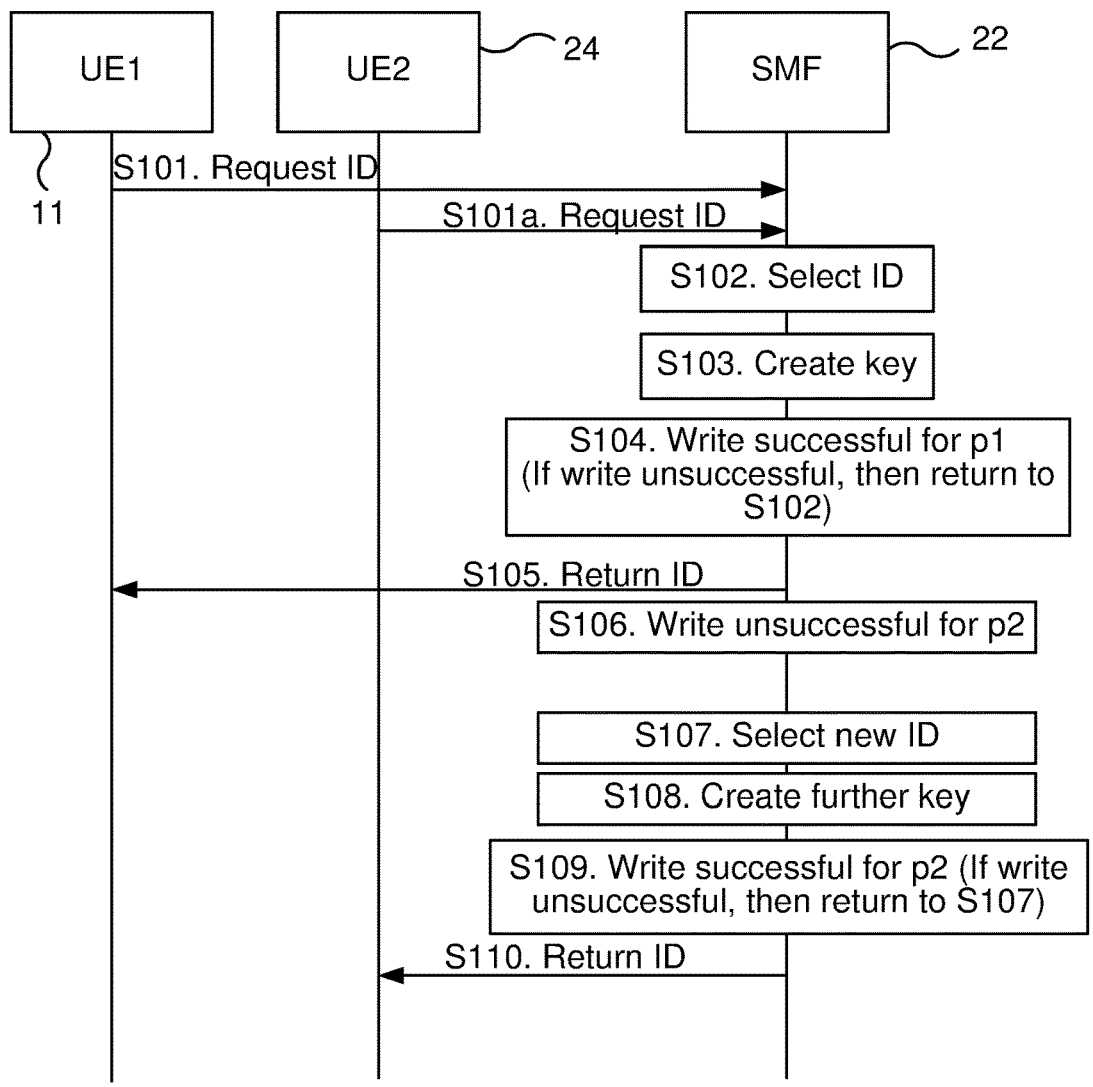
FIG. 3 shows a signalling diagram illustrating another embodiment of a method of a control plane node of allocating a unique identifier.

FIG. 3 shows a signalling diagram illustrating another embodiment of a method of a control plane node of allocating, for a communication device accessing a network in which the control plane node is arranged, a unique identifier using a key-value store.

In this exemplifying embodiment, assuming for instance that a first UE 11 and a second UE 24 both requests an identifier to be allocated. The SMF 22 may thus internally run two processes p1 and p2 which are to allocate identifiers from the same pool of identifiers to the first UE 11 and the second UE 22, respectively. It is further assumed that processes p1 and p2 initially selects the same data identifier "30" to be allocated. It may also be envisaged that multiple SMF instances are running simultaneously, where the multiple instances do allocations from the same pool. Hence, a first SMF runs process p1, while a second SMF runs process p2.

Hence, the first UE 11 sends a request in step S1$o$1 for an identifier while the second UE 24 sends a request in step S101$a$.

In this example, the respective process p1 and p2 running on the SMF 22 thus selects the same identifier "30" to be allocated in step S102, and both process p1 and p2 creates a key denoted "value_30" for representing the identifier "30" selected from the pool in step S103.

Thereafter, both processes p1 and p2 running on the SMF 22 attempts to write to an initial version of a value of the created key "value_30" in order to create a key-value pair ("value_30", "any value") in the key-value store.

Now, assume that both process p1 and p2 simultaneously write value "30" to the initial version "version=1" of the key "value_30"; the two processes p1 and p2 will never write at exactly the same time instance (i.e. the key-value store implements "write" as a so called atomic operation being a known construct in database implementations), so either process p1 is first to write or process p2 is first to write. If process p1 is first, then its write will succeed. If process p2 then attempts to write (to the already written initial version of the value of the key "value_30"), then its write will fail.

As is understood, if the initial version "version=1" of the value of the key already has been written to before p1 and p2 attempted to perform the write, then both processes p1 and p2 will fail. In such case, the processes p1 and p2 will have to select a new identifier from the pool and repeat the process.

As is illustrated in FIG. 3, it is assumed that process p1 is first to write to "version=1" in step S104, and that no write previously has been made to the initial version of the value of key "value-30". As a result, process p1 is successful, and the SMF 22 returns the identifier "30" to the first UE 11 in step S105.

Conversely, process p2 will fail in its attempt to write to "version=1", as illustrated in step S1$o$6, and a new identifier must be selected from the pool in step S107. In this particular example, process p2 selects numerical value "55" as an identifier and subsequently creates a new key denoted "value_55" for representing the selected new identifier "55" in step S108.

In step S109, an attempt will be made by process p2 to write to an initial version of a value of the created new key "value_55" in order to create a further key-value pair "value_55", "any value" in the key-value store. Again, the writing is successful if no write previously has been performed to the initial version of the value of the key "value_55". If so, the selected new identifier "55" is returned to the second UE 24 in step 110 as an allocated identifier.

In practice, the SMF 22 may host a plurality of pools from which identifiers are selected for allocation. In an embodiment, the key name is advantageously a combination of an indication ("value_x") of the identifier ("x") selected from the pool and an identifier ("pool_y") of the pool from which identifier is selected. For instance the name of the created key may then have the form value x∥pool_y, i.e. a concatenation of the two is performed.

Figure 4:
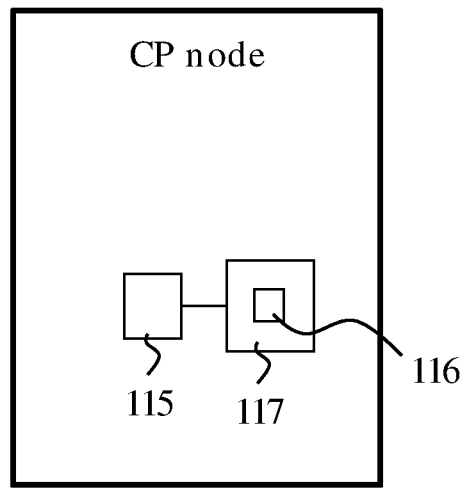
FIG. 4 shows a control plane node according to an embodiment.

FIG. 4 illustrates a control plane (CP) node according to an embodiment, in the form of for instance the SMF 22. The steps of the method performed by the control plane node of allocating, for a communication device accessing a network in which the control plane node is arranged, a unique identifier using a key-value store are in practice performed by a processing unit 115 embodied in the form of one or more microprocessors arranged to execute a computer program 116 downloaded to a suitable storage volatile medium 117 associated with the microprocessor, such as a Random Access Memory (RAM), or a non-volatile storage medium such as a Flash memory or a hard disk drive. The processing unit 115 is arranged to cause the control plane node to carry out the method according to embodiments when the appropriate computer program 116 comprising computer-executable instructions is downloaded to the storage medium 117 and executed by the processing unit 115. The storage medium 117 may also be a computer program product comprising the computer program 116. Alternatively, the computer program 116 may be transferred to the storage medium 117 by means of a suitable computer program product, such as a Digital Versatile Disc (DVD) or a memory stick. As a further alternative, the computer program 116 may be downloaded to the storage medium 117 over a network. The processing unit 115 may alternatively be embodied in the form of a digital signal processor (DSP), an application specific integrated circuit (ASIC), a field-programmable gate array (FPGA), a complex programmable logic device (CPLD), etc.

Figure 5:
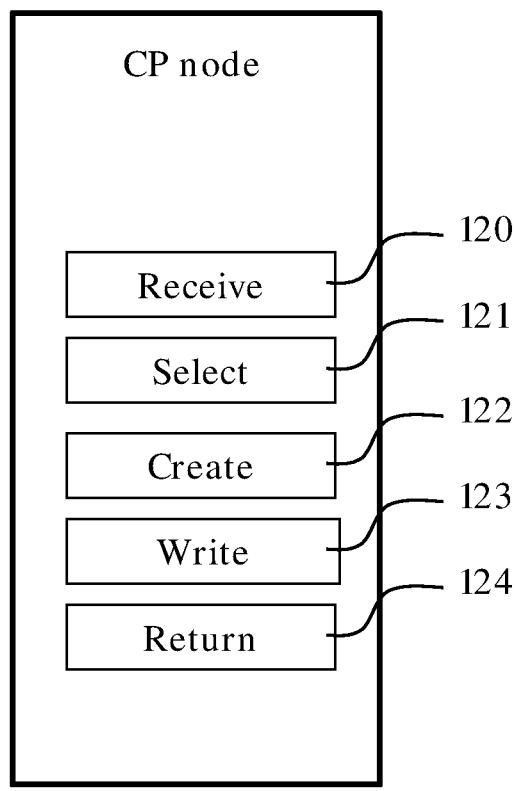
FIG. 5 shows a control plane node according to another embodiment.

FIG. 5 illustrates a control plane (CP) node configured to allocate, for a communication device accessing a network in which the control plane node is arranged, a unique identifier using a key-value store according to another embodiment.

The control plane node comprises receiving means 120 adapted to receive, from a requester, a request for a unique identifier, selecting means 121 adapted to select an identifier from a pool comprising a plurality of unique identifiers held by the control plane node, creating means 122 adapted to create a key representing the selected identifier in the pool, writing means 122 adapted to attempt to write to an initial version of a value of the created key in order to create a key-value pair in the key-value store, wherein the writing is successful if no write previously has been performed to said initial version of the value, and further returning means 124 adapted to return, to the requester, the selected identifier as an allocated identifier in case the write is successful.

The means 120-124 may comprise communication interface(s) for receiving, processing and transmitting information, and further a local storage for storing data, and may (in analogy with that previously discussed) be implemented by a processor embodied in the form of one or more microprocessors arranged to execute a computer program downloaded to a suitable storage medium associated with the microprocessor, such as a RAM, a Flash memory or a hard disk drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of a control plane node of allocating, for a communication device accessing a network in which the control plane node is arranged, a unique identifier using a key-value store, the method comprising:
receiving, from a requester, a request for a unique identifier;
selecting an identifier from a pool comprising a plurality of unique identifiers held by the control plane node;
creating a key representing the selected identifier in the pool;
attempting to write to an initial version of a value of the created key in order to create a key-value pair in the key-value store, wherein the writing is successful if no write previously has been performed to said initial version of the value; and if so;
returning, to the requester, the selected identifier as an allocated identifier.

2. The method of claim 1, wherein the key name is configured to comprise an indication of the identifier selected from the pool.

3. The method of claim 2, wherein the selected identifier is configured to be encoded in the key name.

4. The method of claim 2, wherein the key name further is configured to comprise an identifier of the pool from which the identifier is selected.

5. The method of claim 4, wherein the identifier of the pool is configured to be encoded in the key name.

6. The method of claim 1, wherein if the attempt to write to an initial version of a value of the created key in order to create a key-value pair in the key-value store is unsuccessful, the method further comprises:
selecting another identifier from the pool comprising a plurality of unique identifiers held by the control plane node;
creating a further key representing said selected another identifier in the pool;
attempting to write to an initial version of a value of said created further key in order to create a further key-value pair in the key-value store, wherein the writing is successful if no write previously has been performed to said initial version of the value of said created further key; and if so;
returning, to the requester, the selected another identifier as an allocated identifier.

7. The method of claim 1, wherein the value written to create a key-value pair is one or a combination of: a random value, an identifier of a writer of the value, and numeric value 1.

8. A control plane node configured to allocate, for a communication device accessing a network in which the control plane node is arranged, a unique identifier using a key-value store, the control plane node comprising a processing unit and a memory, said memory containing instructions executable by said processing unit, whereby the control plane node is operative to:
receive, from a requester, a request for a unique identifier;
select an identifier from a pool comprising a plurality of unique identifiers held by the control plane node;
create a key representing the selected identifier in the pool;
attempt to write to an initial version of a value of the created key in order to create a key-value pair in the key-value store, wherein the writing is successful if no write previously has been performed to said initial version of the value; and if so;
return, to the requester, the selected identifier as an allocated identifier.

9. The control plane node of claim 8, wherein the key name is configured to comprise an indication of the identifier selected from the pool.

10. The control plane node of claim 9, wherein the selected identifier is configured to be encoded in the key name.

11. The control plane node of claim 9, wherein the key name further is configured to comprise an identifier of the pool from which the identifier is selected.

12. The control plane node of claim 11, wherein the identifier of the pool is configured to be encoded in the key name.

13. The control plane node of claim 8, further being operative to, if the attempt to write to an initial version of a value of the created key in order to create a key-value pair in the key-value store is unsuccessful:
select another identifier from the pool comprising a plurality of unique identifiers held by the control plane node;
create a further key representing said selected another identifier in the pool;
attempt to write to an initial version of a value of said created further key in order to create a further key-value pair in the key-value store, wherein the writing is successful if no write previously has been performed to said initial version of the value of said created further key; and if so to;
return, to the requester, the selected another identifier as an allocated identifier.

14. A non-transitory computer-readable storage medium comprising a computer program product including instructions to cause at least one processor to:
receive, from a requester, a request for a unique identifier;
select an identifier from a pool comprising a plurality of unique identifiers held by the control plane node;
create a key representing the selected identifier in the pool;
attempt to write to an initial version of a value of the created key in order to create a key-value pair in the key-value store, wherein the writing is successful if no write previously has been performed to said initial version of the value; and if so;
return, to the requester, the selected identifier as an allocated identifier.

* * * * *